United States Patent
Schudel et al.

(10) Patent No.: US 9,595,302 B2
(45) Date of Patent: Mar. 14, 2017

(54) HARD DISK DRIVE COVER WITH DIFFERENTIAL INNER AND OUTER SURFACE ROUGHNESS

(71) Applicant: Intri-Plex Technologies, Inc., Santa Barbara, CA (US)

(72) Inventors: Dale Frederick Schudel, Nonthaburi (TH); Hendrikus Petrus Helena Thijssen, Singapore (SG); Ryan John Schmidt, Santa Barbara, CA (US)

(73) Assignee: INTRI-PLEX TECHNOLOGIES, INC., Santa Barbara, CA (US)

( * ) Notice: Subject to any disclaimer, the term of this patent is extended or adjusted under 35 U.S.C. 154(b) by 0 days.

(21) Appl. No.: 14/255,652

(22) Filed: Apr. 17, 2014

(65) Prior Publication Data
US 2015/0302897 A1  Oct. 22, 2015

(51) Int. Cl.
| | | |
|---|---|---|
| *G11B 33/14* | (2006.01) | |
| *G11B 33/02* | (2006.01) | |
| *B21D 22/02* | (2006.01) | |
| *B24C 1/00* | (2006.01) | |
| *B24B 1/00* | (2006.01) | |
| *B21D 28/06* | (2006.01) | |
| *G11B 25/04* | (2006.01) | |
| *B21B 1/22* | (2006.01) | |
| *B21B 27/02* | (2006.01) | |
| *B21B 27/00* | (2006.01) | |

(52) U.S. Cl.
CPC ............ *G11B 33/027* (2013.01); *B21D 22/02* (2013.01); *B21D 28/06* (2013.01); *B24B 1/00* (2013.01); *B24C 1/00* (2013.01); *G11B 25/043* (2013.01); *G11B 33/1446* (2013.01); *B21B 1/227* (2013.01); *B21B 27/005* (2013.01); *B21B 27/021* (2013.01)

(58) Field of Classification Search
CPC .......................... G11B 33/027; G11B 33/1446
USPC .................................. 360/99.18, 99.22, 97.12
See application file for complete search history.

(56) References Cited

U.S. PATENT DOCUMENTS

| | | | |
|---|---|---|---|
| 6,721,128 B1 * | 4/2004 | Koizumi ............ | G11B 33/1466 360/99.21 |
| 7,654,538 B2 * | 2/2010 | Oka ...................... | F16J 15/022 277/644 |
| 8,228,630 B2 * | 7/2012 | Ajmani ................ | G11B 5/4846 360/88 |
| 8,284,514 B1 * | 10/2012 | Garbarino .......... | G11B 17/0287 360/99.08 |

(Continued)

FOREIGN PATENT DOCUMENTS

WO  WO 2012/169598 A1 * 12/2012

*Primary Examiner* — Jefferson Evans (57) ABSTRACT

A hard disk drive cover with a smooth bottom (inner) surface and a textured outer surface is provided for covering a hard disk drive base assembly. A method of manufacturing the hard disk includes providing a metal material. The metal material is worked into a metal strip having a textured surface and an opposing smooth surface. A hard disk drive cover is stamped from the worked metal strip with the smooth surface being the inner surface of the stamped cover. The smooth inner surface of the hard disk drive advantageously enhances cleanliness within the base assembly. The smooth surface finish on the inner surface also advantageously enhances shear strength of a bond between a gasket and the inner surface.

16 Claims, 12 Drawing Sheets

(56) References Cited

U.S. PATENT DOCUMENTS

| | | | |
|---|---|---|---|
| 8,837,080 B2* | 9/2014 | McGuire, Jr. | G11B 25/043 360/97.19 |
| 9,202,483 B1* | 12/2015 | Taniguchi | G11B 25/043 |
| 2006/0126218 A1* | 6/2006 | Chen | G11B 5/6005 360/97.14 |
| 2008/0192586 A1* | 8/2008 | Carrard | G04B 37/08 368/295 |
| 2011/0122567 A1* | 5/2011 | Cheah | G11B 25/043 361/679.33 |
| 2015/0228300 A1* | 8/2015 | Sugi | G11B 33/1486 360/97.19 |

* cited by examiner

HARD DISK DRIVE COVER WITH DIFFERENTIAL INNER AND OUTER SURFACE ROUGHNESS

BACKGROUND OF THE INVENTION

1. Field of the Invention

The present invention relates to hard disk drive covers for hard disk drive assemblies and methods of manufacturing hard disk drive covers.

2. Description of Related Art

Hard disk drives and related drive assembly components are contained in a disk drive motor base assembly ("base assembly"). A hard disk drive cover ("cover") made of a metal is mounted on the base assembly. The cover protects the base assembly from externally introduced particles, chemical compounds in the outside environment, or other types of contamination.

Figure 1:
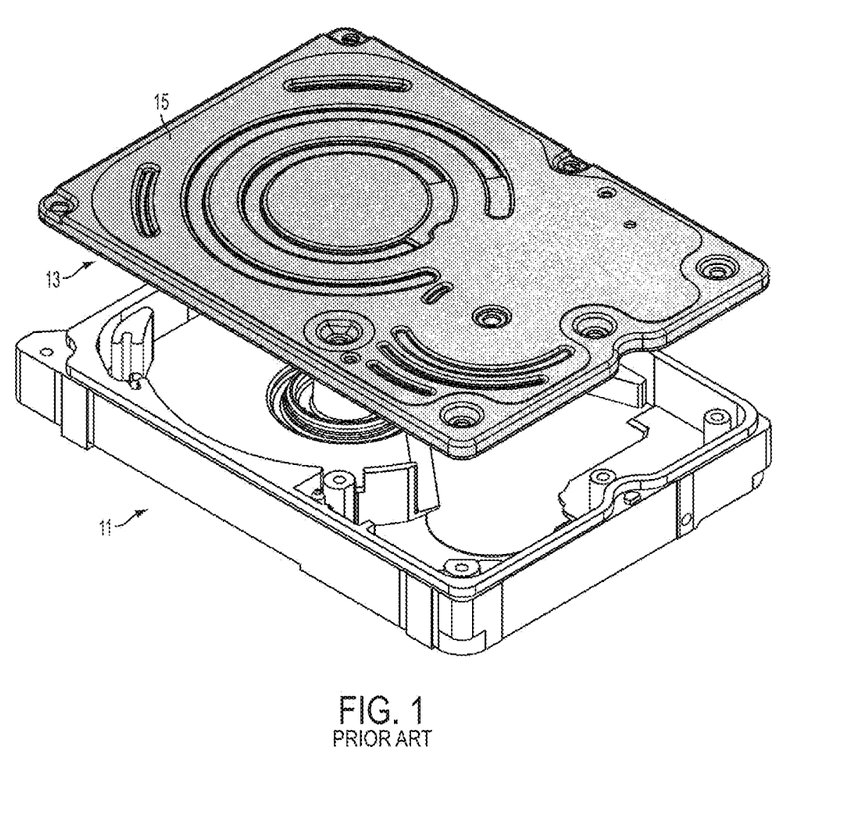
FIG. 1 is a top perspective exploded illustration of a hard disk drive cover and a disk drive base assembly.
Figure 2:
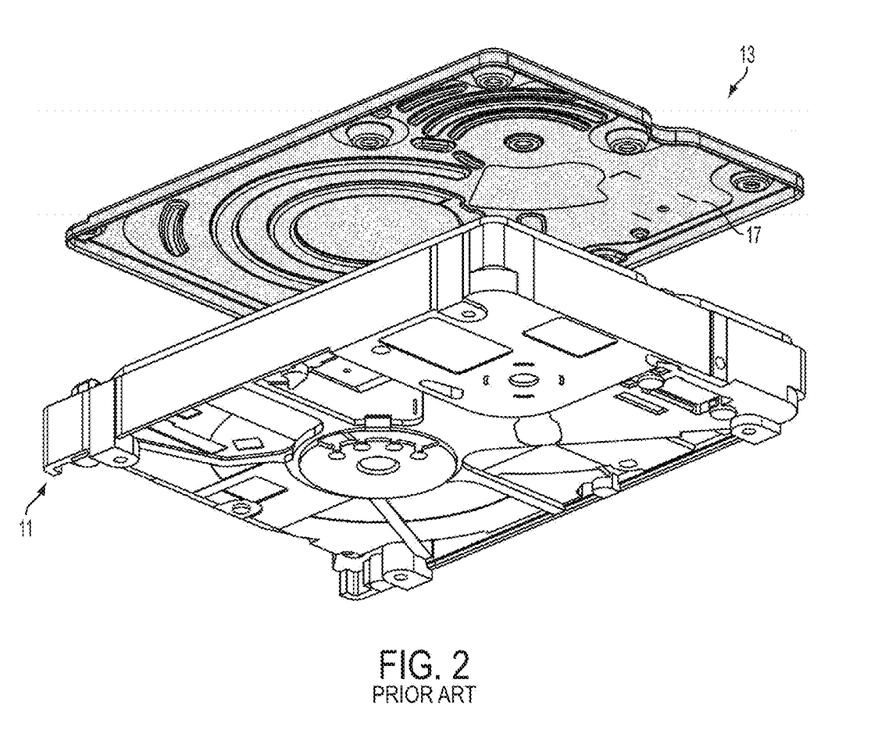
FIG. 2 is a perspective bottom exploded illustration of the cover and the base assembly of FIG. 1.
Figure 3:
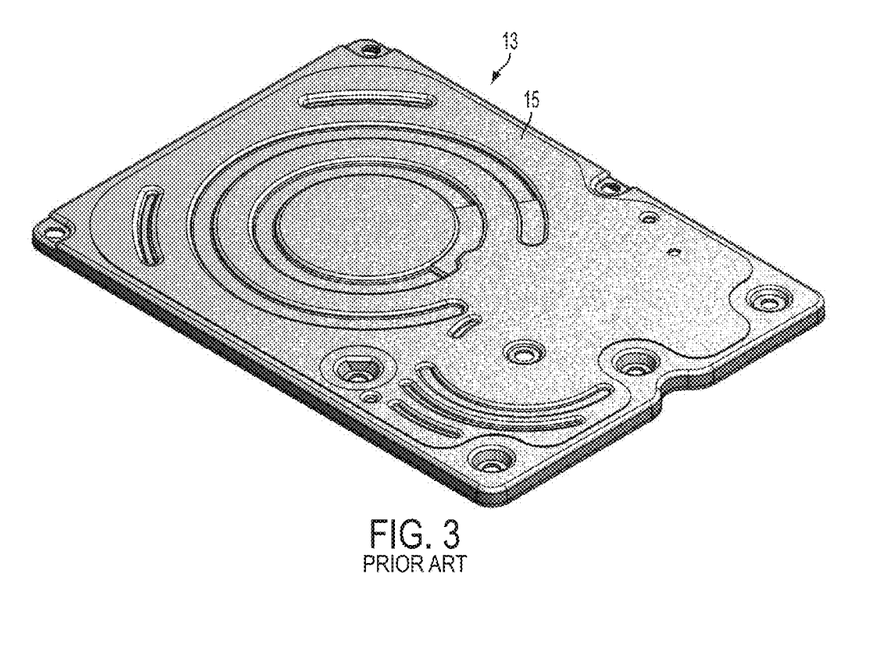
FIG. 3 is a top perspective illustration of a hard disk drive cover, showing a textured top surface.
Figure 4:
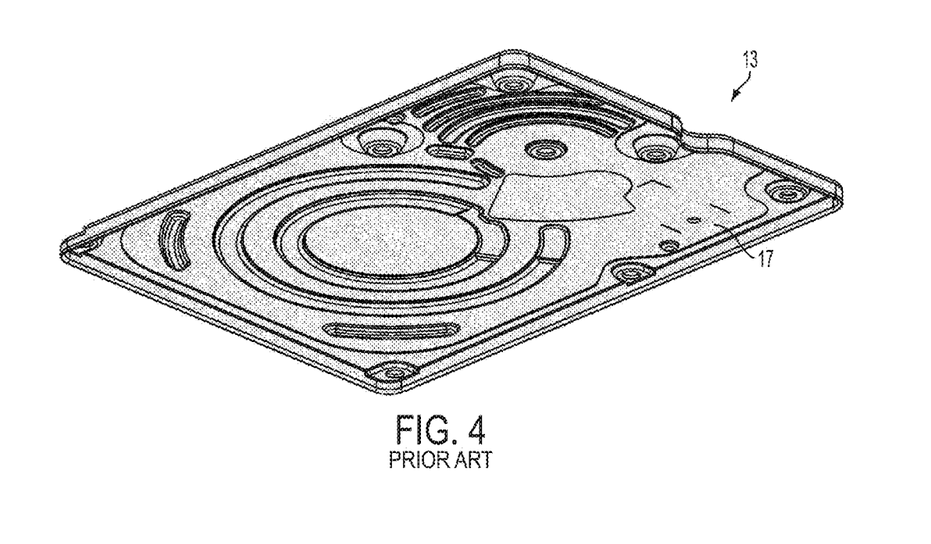
FIG. 4 is a bottom perspective illustration of the cover of FIG. 3, showing a textured bottom surface.

FIG. 1 is a top perspective illustration of a cover 13 having an outer surface 15 and a base assembly 11. FIG. 2 is a bottom perspective illustration of the cover 13 having an inner surface 17 and the base assembly 11. FIG. 3 is a top perspective illustration of the cover 13 showing the outer surface 15. FIG. 4 is a bottom perspective illustration of the cover 13 showing the inner surface 17.

The top (outer) surface 15 and bottom (inner) surface 17 are both textured using a common metal surface texturing procedure. The surfaces 15 and 17 of the cover 13 have the same textured surface finish, as shown in FIGS. 1-4. The textured surfaces enhance the visual appearance of the cover 13, preventing and/or hiding scratches and visual blemishes. The textured surface finish has a relatively high roughness average (Ra).

Ra is a measure of an average of vertical deviations of peaks and valleys of a surface. Ra is quantified by measuring vertical deviations of a surface using a profilometer per ASTM standard B46.1. For example, each of the opposing surfaces 15 and 17 of the cover 13 has a textured "2D" surface finish as defined by the ASTM standard A480. A 2D surface finish has a roughness average in the range of 0.4-1.0 micrometers (μm). Ra may be measured, using other metrics. For example, roughness may be measured using root mean square, maximum valley depth/maximum peak height, maximum height of the profile, skewness, kurtosis, average distance between the highest and lowest valley in each sampling segment, and various other metrics.

Electroless nickel (EN) plating is an auto-catalytic chemical process that deposits a layer of nickel-phosphorus or nickel-boron alloy on a metal surface. An EN plated cover enhances cleanliness because it creates a continuous tightly bonded coating. An EN plated cover also reduces scratches due to its hardness rather than its roughness or texture. However, EN plating is very expensive, particularly for the relatively large surface area of the hard disk cover. Most cost-sensitive hard disk drive covers are passivated stainless steel as it is the most cost-effective solution available. However, passivated covers do not meet cleanliness requirements.

Hard disk drive builders require and have been seeking a hard disk drive cover that can meet strict cleanliness requirement in addition to providing a good visual appearance. A problem associated with utilizing the same textured finish on the top surface 15 and the bottom surface 17 of the cover 13 is that the textured bottom surface 17 does not meet cleanliness requirements. Textured surfaces are rough and not easily cleaned. Furthermore, they shed a greater amount of particles. Particles of metal and metal oxide, for example, down to less than or equal to 0.1 μm (micrometers) in size can cause drive reliability issues. This type of cover does not meet the cleanliness requirements of hard disk drive builders and users.

There is an urgent need for a hard disk drive cover that can meet both stringent cleanliness requirements and visual appearance requirements. There is also a need for a cost-effective and reliable method of manufacturing a hard disk drive cover that meets the required cleanliness and visual appearance requirements.

SUMMARY OF THE INVENTION

A hard disk drive cover ("cover") with a smooth bottom (inner) surface and a textured top (outer) surface is provided. The smooth inner surface faces a hard disk drive motor base assembly ("base assembly"). The textured outer surface provides the visual appearance desired. The cover meets cleanliness requirements because the smooth inner surface is easy to clean and sheds few particles under normal disk drive operating conditions. The cover also meets visual appearance requirements because the textured top surface prevents, reduces and/or hides scratches and visual blemishes.

In a preferred embodiment, the top surface of the cover has a roughness average that is at least 0.127 μm greater than the roughness average of the inner surface. In one embodiment, the outer surface has a roughness average that is 2-10 times the roughness average of the inner surface.

A method of making the cover starts with a metal material. The metal material is worked into a metal strip having a surface that is rougher than an opposing surface. In a preferred embodiment, the metal material is worked by passing it through a plurality of rollers. A roller that is textured or patterned creates a textured surface on the metal coming into contact with it. Another opposite roller in contact with the opposing surface is smooth, creating a smooth opposing surface. After texturing, the cover is stamped from the worked metal strip so that the smooth surface is the bottom (inner) surface of the stamped cover.

An alternative method of making the cover comprises a metal strip having two smooth opposing surfaces formed from the metal material using a plurality of rollers. One of the opposing smooth surfaces of the metal strip is then textured (or roughened) by chemically or electrochemically etching, or abrasively blasting, or mechanically abrading using an abrasive material, or similar equivalent methods for texturing (or roughening) the surface. The textured or roughened surface becomes the top (outer) surface of a cover. Alternatively, the cover is formed from the smooth metal strip and then the top (outer) surface is textured or roughened.

Another method of making the cover comprises a metal strip having two textured (or rough) opposing surfaces formed from a metal material using a plurality of rollers. One of the opposing surfaces of the metal strip is then smoothed by polishing or grinding, or chemically or electrochemically polishing, or similar equivalent method for smoothing one of the opposing surfaces. Once one of the opposing surfaces has been smoothed, a cover is formed from the worked metal strip by stamping, for example, using a die. Alternatively, the cover can be formed from the textured metal strip and then the bottom (inner) surface of the cover is smoothed using the above mentioned alternatives.

The above mentioned methods of manufacturing the cover create a differential surface finish in the textured top (outer) surface of the cover and the smooth bottom (inner) surface of the cover. The relatively smoother bottom (inner) surface of the cover always faces the base assembly, enhancing cleanliness in the base assembly.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 5:
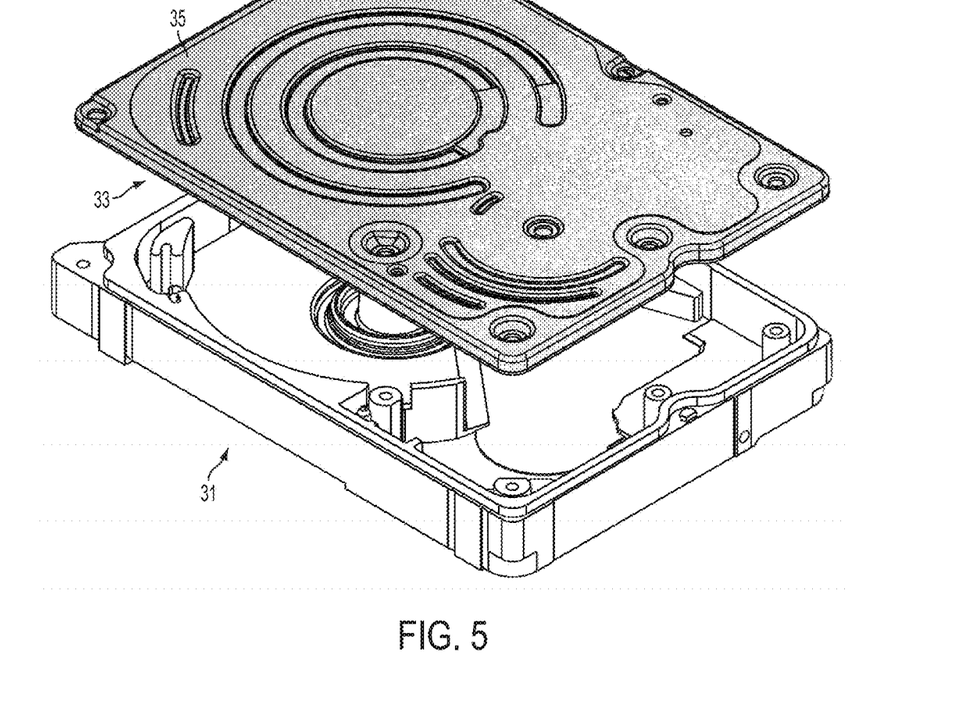
FIG. 5 is a top perspective exploded illustration of a hard disk drive cover for a disk drive base assembly, according to the present invention.
Figure 6:
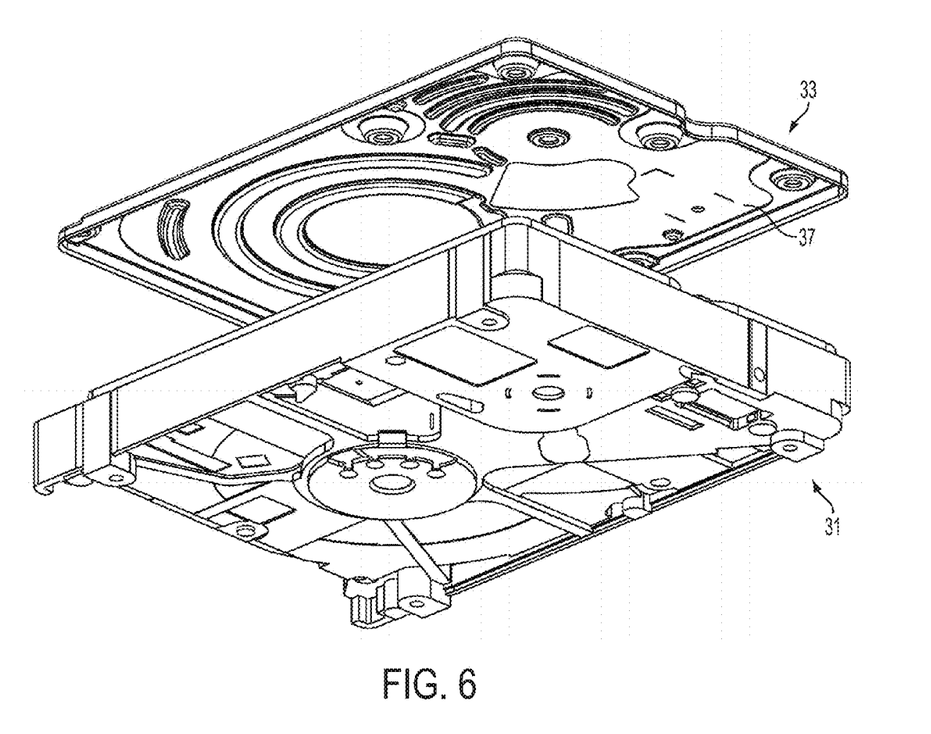
FIG. 6 is a bottom perspective exploded illustration of the cover and the base assembly of FIG. 5, showing a smooth bottom surface.
Figure 7:
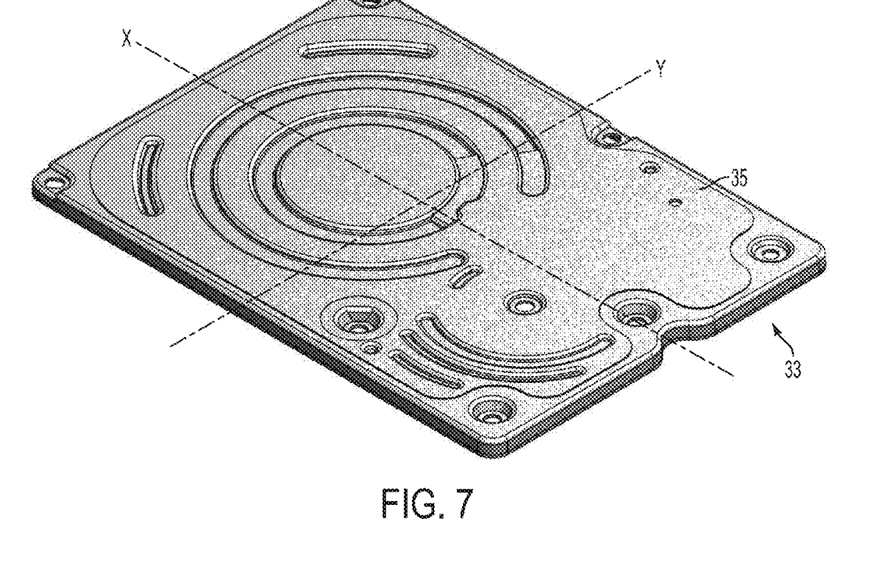
FIG. 7 is a top perspective illustration of a hard disk drive cover, according to the present invention.
Figure 8:
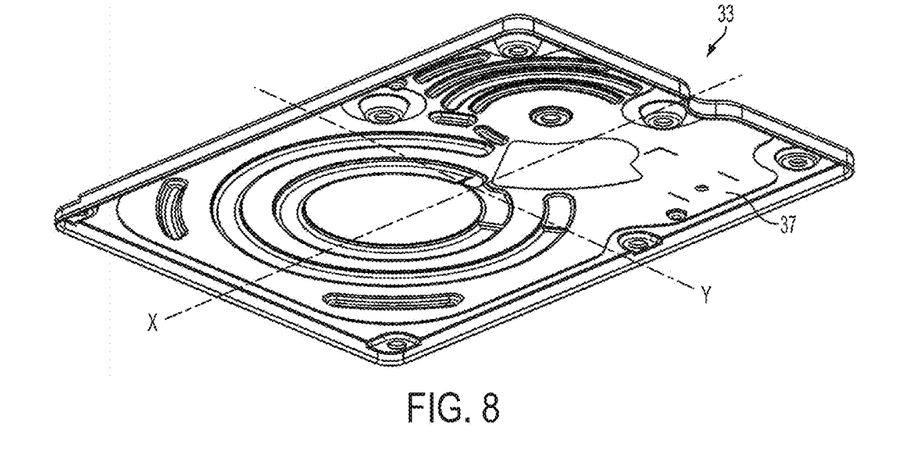
FIG. 8 is a bottom perspective illustration of the cover of FIG. 7.

FIG. 5 shows a hard disk drive cover 33 having a textured outer surface 35 for covering a hard disk drive motor base assembly 31. FIG. 6 shows a hard disk drive cover 33 having a smooth bottom (inner) surface 37. The smooth inner surface 37 is oriented towards the interior of the base assembly 31. FIG. 7 is a closer view of a textured top (outer) surface 35 of the cover 33. FIG. 8 is a closer view of the smooth bottom (inner) surface 37.

Unlike the covers in the prior art, the smooth bottom surface 37 meets stringent cleanliness requirements. The smooth bottom surface 37 of the cover 33 is easy to clean and sheds few particles, keeping the inside of the base assembly 31 relatively particle free. The cleanliness of the smooth bottom surface 37 can be measured using industry metrologies such as liquid particle count (LPC) testing and scanning electron microscope (SEM)/energy-dispersive X-ray spectroscopy (EDS) inspection of specialized tape removed from the smooth bottom surface 37.

Test data has shown that the smooth bottom 37 sheds significantly fewer particles than textured bottom surfaces used in the art. In a preferred embodiment, the bottom surface 37 has a "BA" metal surface finish (having Ra in range of 0.05-0.1 µm), as defined by the ASTM standard A480. Cleanliness of a cover 33 made from 304 stainless steel according to the invention was tested. The bottom surface 37 of the cover 33 was made with a "BA" surface finish and measured 0.074 µm Ra using a profilometer. The rougher top surface 35 of the cover 33 measured 0.93 µm Ra. Cleanliness of the cover 33 was compared with a 304 stainless steel cover 13 (FIG. 1) used in the prior art. The cover 13 had the same Ra of 0.7 µm on both the top surface 15 and the bottom surface 17. The bottom surface 37 (FIG. 8) of the invention shed 55% fewer particles than the textured bottom surface 17 (FIG. 2) of the prior art cover 13, as measured using an industry-established rinse liquid particle counting method. The bottom surface 37 shed 53% fewer particles than the textured bottom surface 17 of the prior art cover 13, as measured using an industry-standard contact transfer analysis method. The contact transfer analysis method employs a scanning electron microscope with energy-dispersive X-ray spectroscopy to count and categorize the shed particles.

The bottom surface 37 and the top surface 35 are designed and manufactured to maintain cleanliness within the base assembly 31. The visual appearance of the exterior of the cover 33 is maintained because the textured top surface 35 prevents, reduces and/or hides scratches and visual blemishes.

In a preferred embodiment, the predetermined Ra of the textured top surface 35 is at least 0.127 micrometers (µm) greater than the predetermined Ra of the smooth bottom surface 37 to achieve the foregoing objectives. In alternate embodiments, the predetermined Ra of the top surface 35 is 2-10 times the predetermined Ra of the bottom surface 37. In other alternate embodiments, the predetermined Ra of the top surface 35 is 5-8 times the predetermined Ra of the bottom surface 37. In other preferred embodiments, the predetermined Ra of the bottom surface 37 is greater than or equal to 0.051 µm and less than or equal to 0.254 µm, and the predetermined Ra of the top surface 35 is greater than or equal to 0.381 µm and less than or equal to 1.27 µm.

In a preferred embodiment, the bottom surface 37 has a "BA" metal surface finish (having Ra in range of 0.05-0.1 µm), as defined by the ASTM standard A480. In another embodiment, the bottom surface 37 may have a "2B" surface finish, but with a relatively low Ra. The Ra of the "2B" surface finishes range from 0.1 to 0.5 µm. The low "2B" surface finish has a roughness average in range of 0.1-0.254 µm. The top surface 35 may have a "2D" metal surface finish (having Ra in range of 0.4-1.0 µm) or a metal surface finish with a higher roughness average.

Figure 11:
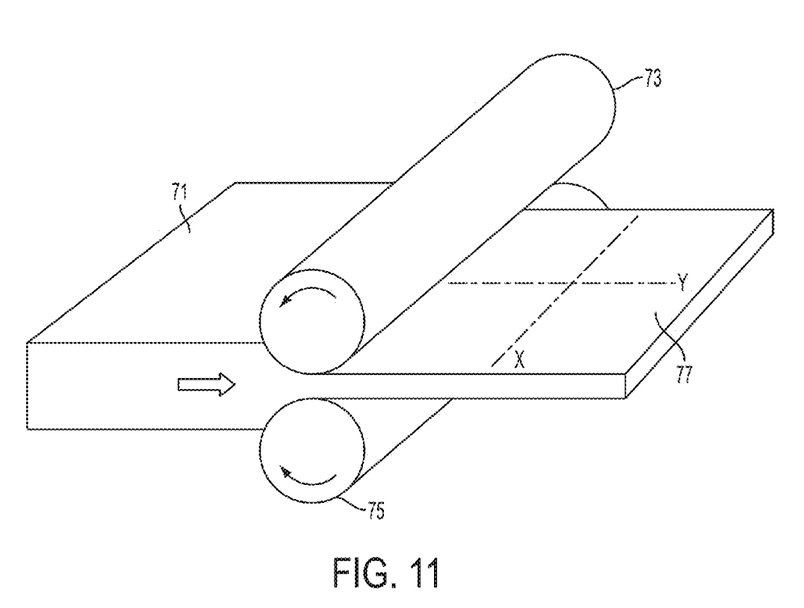
FIG. 11 is a perspective illustration of a preferred working step using a pair of rollers to work a metal material into a strip having a smooth bottom surface.

Table 1, below, lists roughness averages for surfaces that can be utilized. Example 1 in Table 1 is for a cover with a smooth bottom surface 37 having a "BA" finish. The X column for the "BA" finish refers to the average of measurements taken by a profilometer along the X axis (for example, the X axis as shown in FIG. 7 or 11). The Y column for the "BA" finish refers to the average of measurements taken by a profilometer along the Y axis (for example, the Y axis as shown in FIG. 7 or 11). Ra is calculated by taking an average of the absolute value of the recorded vertical deviations. Table 1 shows the averages taken for 5 samples. A higher number of samples may be taken to increase the accuracy of the determined average. The "Average" row indicates the average of the sampled values. The "Standard Deviation" row indicates the standard deviation of the sampled values. In certain samples, roughness as measured along the X axis can be greater than roughness measured along the Y axis. In other samples, the two values can be the same, or the roughness along the Y axis can be greater, depending on design concerns or the manufacturing method utilized. Example 2 in Table 1 refers to a textured top surface 35. Roughness average of the top surface 35 is similarly determined using measurements along the X axis and the Y axis.

|  | Example 1 - smooth bottom surface finish ("BA" finish) | | Example 2 - textured top surface finish | |
|---|---|---|---|---|
|  | X | Y | X | Y |
| Sample 1 | 0.075 | 0.065 | 0.996 | 0.796 |
| Sample 2 | 0.084 | 0.070 | 1.108 | 0.837 |
| Sample 3 | 0.088 | 0.070 | 0.960 | 0.711 |
| Sample 4 | 0.083 | 0.072 | 1.106 | 0.906 |
| Sample 5 | 0.071 | 0.067 | 0.961 | 0.899 |
| Average | 0.080 | 0.069 | 1.026 | 0.830 |
| Standard Deviation | 0.007 | 0.003 | 0.0752 | 0.080 |

Figure 9:
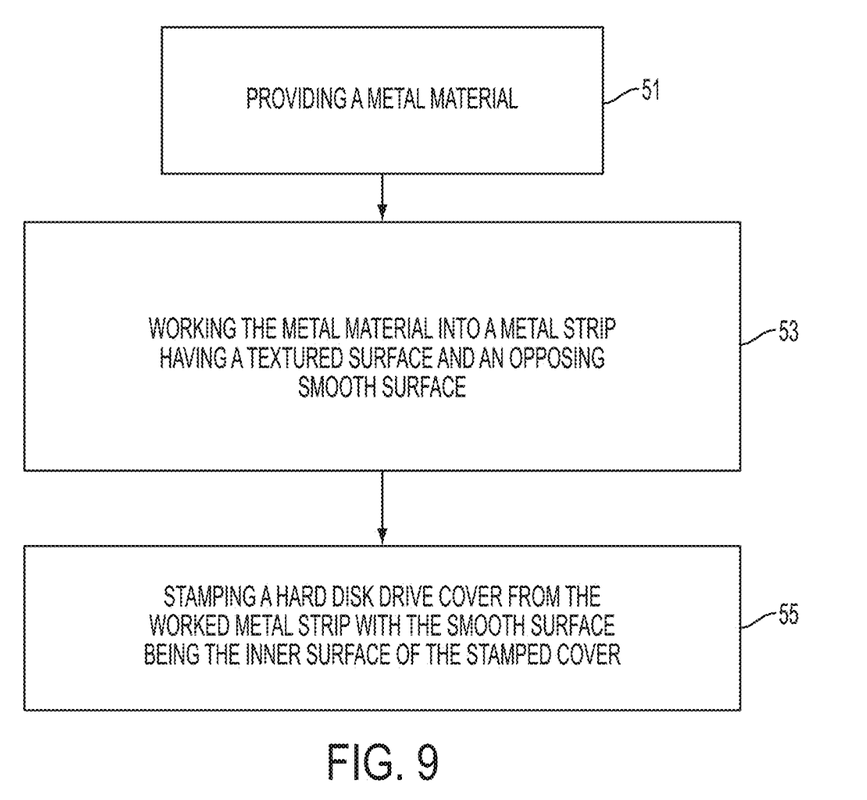
FIG. 9 is a flow diagram illustrating the steps of a method of manufacturing a hard disk drive cover, according to the present invention.

FIG. 9 is a flow diagram of a method of manufacturing the hard disk drive cover 33 having a top surface 35 and a bottom surface 37 that is smoother than the top surface 35. Step 51 of the method includes providing a metal material having two opposing surfaces. The preferred metal materials can be stainless steel, steel alloys, or materials having similar characteristics. More particularly, 400 series stainless steel (430 in particular), 300 series stainless steel (304 in particular), 200 series stainless steel, or other series or grades of stainless steel can be utilized. In one embodiment, stainless steel alloy that is not nickel plated can be used. The stainless steel alloy can be passivated for corrosion resistance. In another embodiment, an alloy of steel, nickel, and at least 10% chromium can be used.

Step 53 includes working the metal material into a strip having a textured surface and an opposing smooth surface. In step 55, a hard disk drive cover is stamped and formed from the worked metal strip. Progressive die stamping, for example, can be used.

Figure 10:
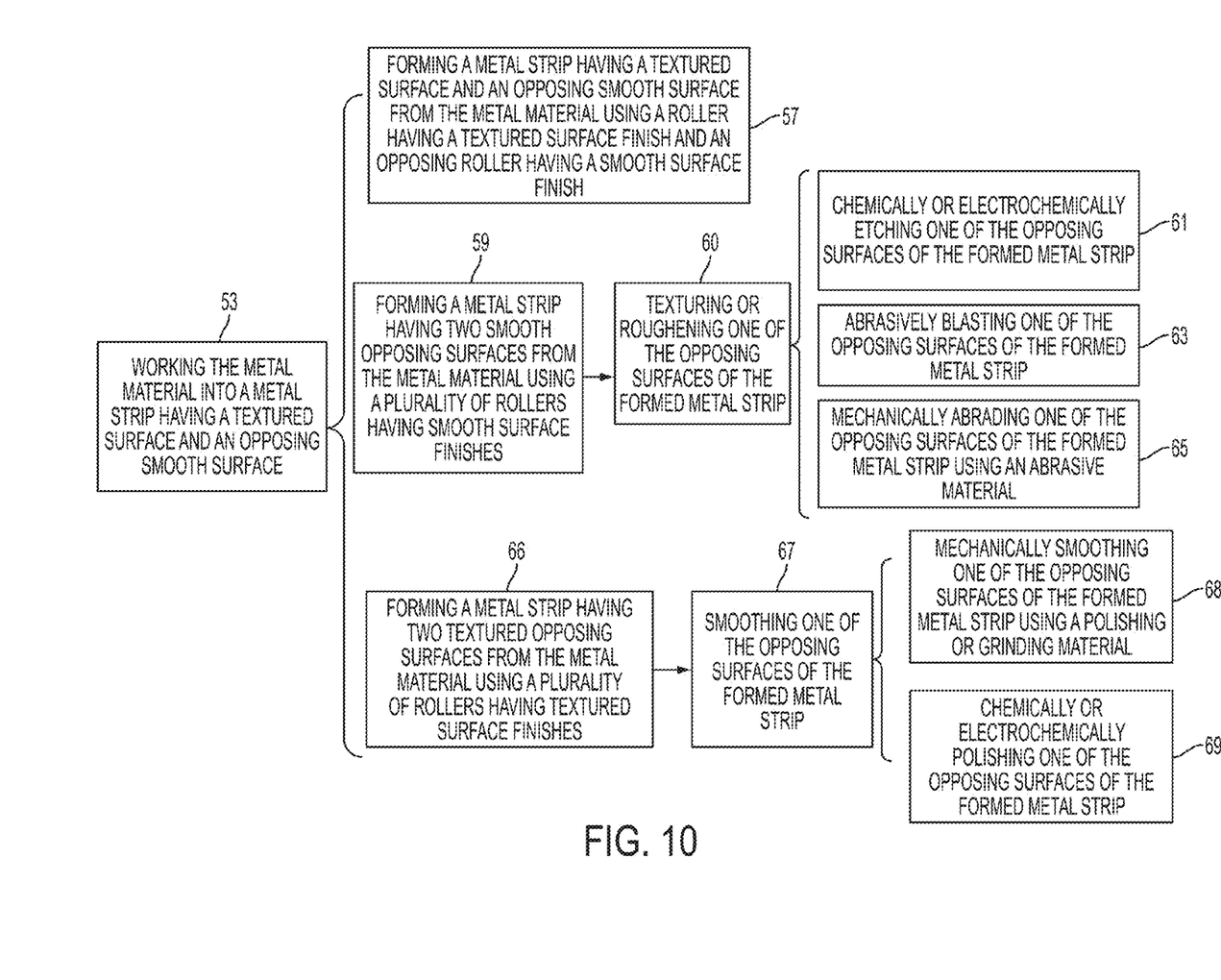
FIG. 10 is a block diagram illustrating different preferred metal working steps, according to the method of manufacturing the hard disk drive cover.

FIG. 10 shows different working steps for the metal material that can be utilized in the method of manufacture shown in FIG. 9. In step 57, the metal strip is formed from the metal material using a plurality of rollers having differential surface finishes, according to a preferred embodiment. The plurality of rollers include at least a roller having a textured surface finish and an opposing roller having a smooth surface finish.

FIG. 11 illustrates a pair of rollers 73 and 75 for working a metal material 71 into a metal strip 77. A first roller 73 is designed to press a surface of the metal material 71 so that the top surface of the metal strip 77 has a textured surface. The second roller 75 is designed to have a smooth surface so that an opposing surface of the metal strip 77 has a smooth surface. Various other metal rolling methods or steps may be utilized to produce a differential surface with a smoother bottom surface.

Alternatively, in step 59 of FIG. 10, a metal strip having two smooth opposing surfaces is formed from the metal material using a plurality of rollers. For example, each of the pair of rollers 73 and 75 can have a smooth surface finish.

In step 60, once the metal strip having two opposing smooth surfaces is formed, one of the opposing surfaces of the metal strip is textured (or roughened). Step 60 can include one of steps 61, 63, or 65, or similar processes for texturing (or roughening) one of the opposing surfaces.

In step 61, one of the opposing smooth surfaces is chemically or electrochemically etched before the metal is stamped and formed in step 55 of the manufacturing process.

In step 63, one of the opposing smooth surfaces is abrasively blasted before the metal strip is stamped and formed in step 55. Abrasive blasting includes bead blasting one of the opposing surfaces of the metal strip or the top surface of the formed cover.

In step 65, one of the opposing smooth surfaces is mechanically abraded using an abrasive material before the metal strip is stamped and formed in step 55. In another embodiment, the cover is formed before the outer surface is mechanically abraded. Mechanically abrading one of the surfaces includes brushing with a wire brush or an abrasive pad. Mechanically abrading one of the surfaces alternatively includes sanding one side of the material strip before stamping and forming. In a preferred embodiment, step 65 is performed on one side of the material surface as a material feeder is pulling the metal strip into a stamping die.

Alternatively, in step 66, a metal strip having two textured opposing surfaces is formed from the metal material using a plurality of rollers. For example, both rollers 73 and 75 have a textured surface finish. In step 67, one of the opposing surfaces of the metal strip is smoothed in step 67. Step 67 can include one of steps 68, 69, or similar processes for smoothing one of the surfaces.

In step 68, one of the opposing textured surfaces is mechanically smoothed by polishing or grinding before the metal strip is stamped and formed in step 55.

Alternatively, in step 69, one of the opposing textured surfaces is chemically or electrochemically polished before the metal strip is stamped and formed in step 55.

The above discussion refers to texturing or smoothing one of the opposing surfaces. Regardless of the method used to create a differential surface finish, the smoother bottom surface 37 of the final hard disk drive cover 33 is the inner surface, facing the base assembly 31, as shown in FIGS. 5-8. The textured top surface 35 of the final hard disk drive cover 33 is the outer surface, being oriented away from the base assembly 31.

Figure 12:
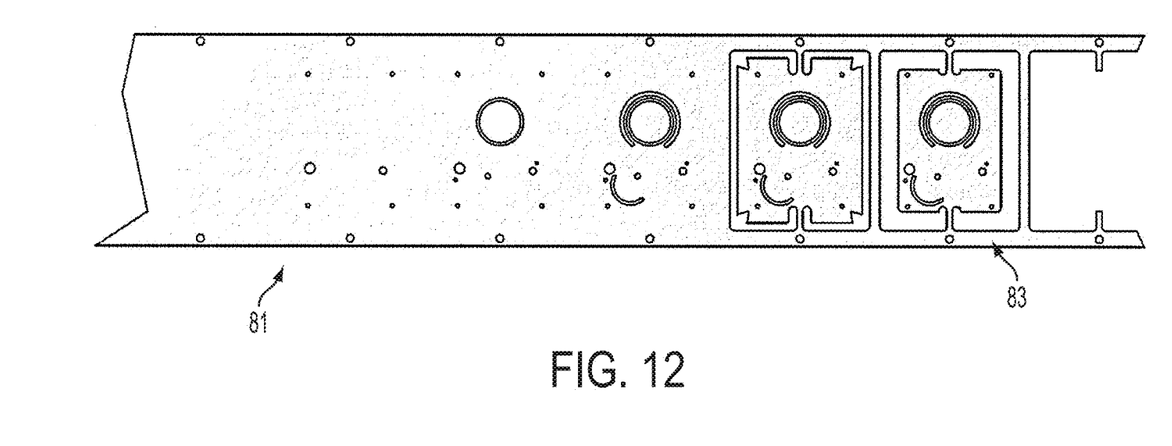
FIG. 12 is a top plan view of hard disk drive covers formed by progressive die stamping.

FIG. 12 shows an example of the worked metal strip 81 which is stamped and formed using progressive die stamping. The stamping and forming may include piercing and trimming of the metal strip fed into the die, followed by forming and blanking/cutting to form a hard disk drive cover 83. Examples of resulting hard disk drive covers are shown in FIGS. 5-8.

Figure 13:
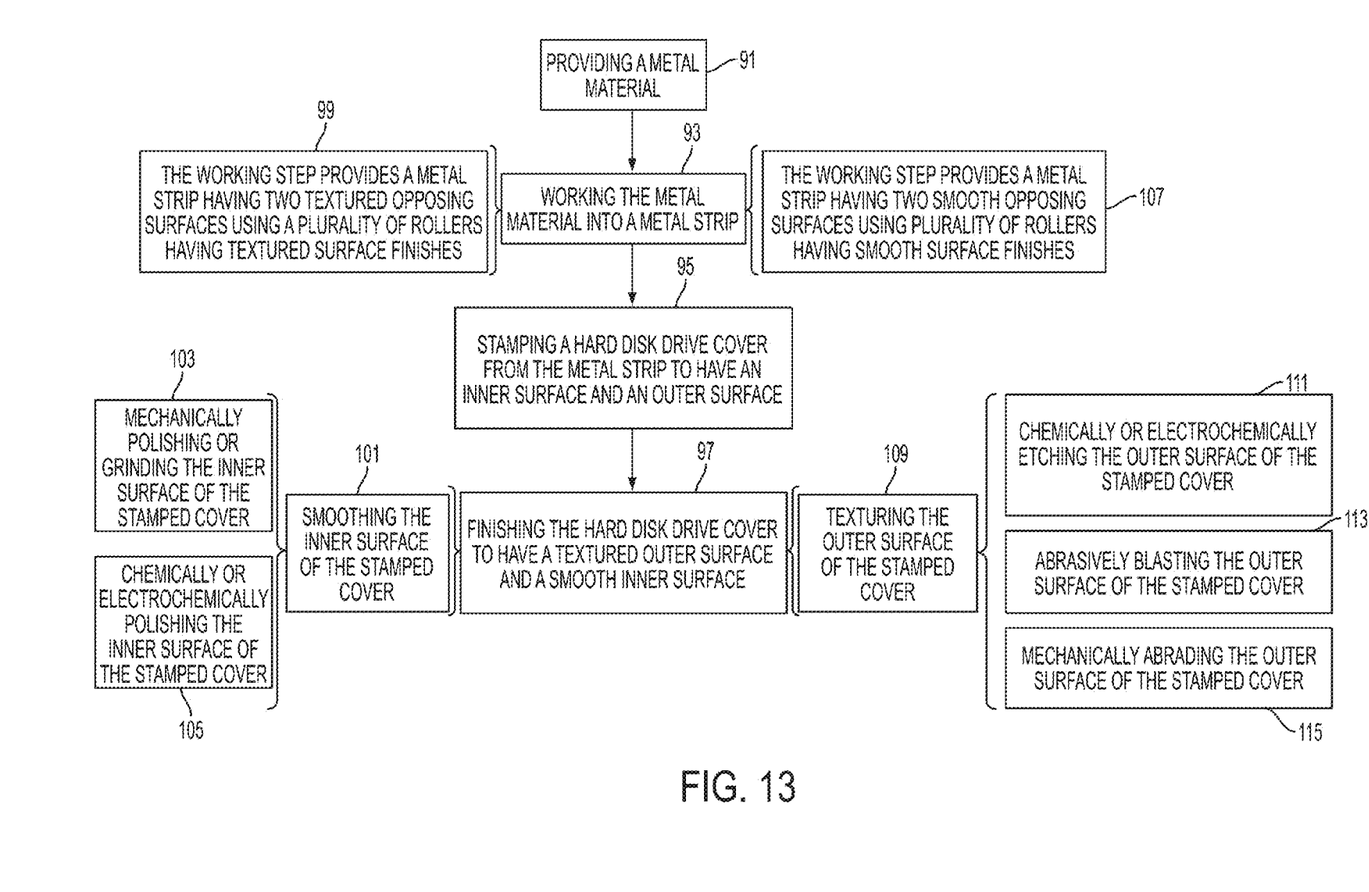
FIG. 13 is a flow diagram illustrating the steps of an alternative method of manufacturing a hard disk drive cover.

FIG. 13 shows an alternative method of manufacturing the hard disk drive cover 33 having a differential surface finish. The hard disk drive cover is stamped from the metal strip and then the surface finishing is performed. Step 91 of the method includes providing a metal material having two opposing surfaces. Step 93 includes working the metal material into a strip. In step 95, a hard disk drive cover is stamped and formed from the worked metal strip. In step 97, the hard disk drive cover is surface finished to have a textured outer surface and a smoother inner surface.

In step 99, the working step provides a metal strip having two textured opposing surfaces. The working step includes passing the material through at least two rollers having textured surface finishes. In step 95, the hard disk drive cover is then stamped from the metal strip. In step 101, the inner surface of the stamped cover is smoothed. In step 103, the inner surface is smoothed by mechanically polishing or grinding the inner surface of the stamped cover. Alternatively, in step 105, the inner surface is smoothed by chemically or electrochemically polishing the inner surface of the stamped cover.

Alternatively, in step 107, the working step provides a metal strip having two smooth opposing surfaces. The working step includes passing the material through at least two rollers having smooth surface finishes. In step 95, the hard disk drive cover is then stamped from the metal strip. In step 109, the finishing the hard disk drive cover includes texturing (or roughening) the outer surface of the stamped cover. In step 111, the outer surface is textured by chemically or electrochemically etching the outer surface of the stamped cover. Alternatively, in step 113, the outer surface is textured by abrasively blasting the outer surface of the stamped cover. Alternatively, in step 115, the outer surface is textured by mechanically abrading the outer surface of the stamped cover.

Figure 14:
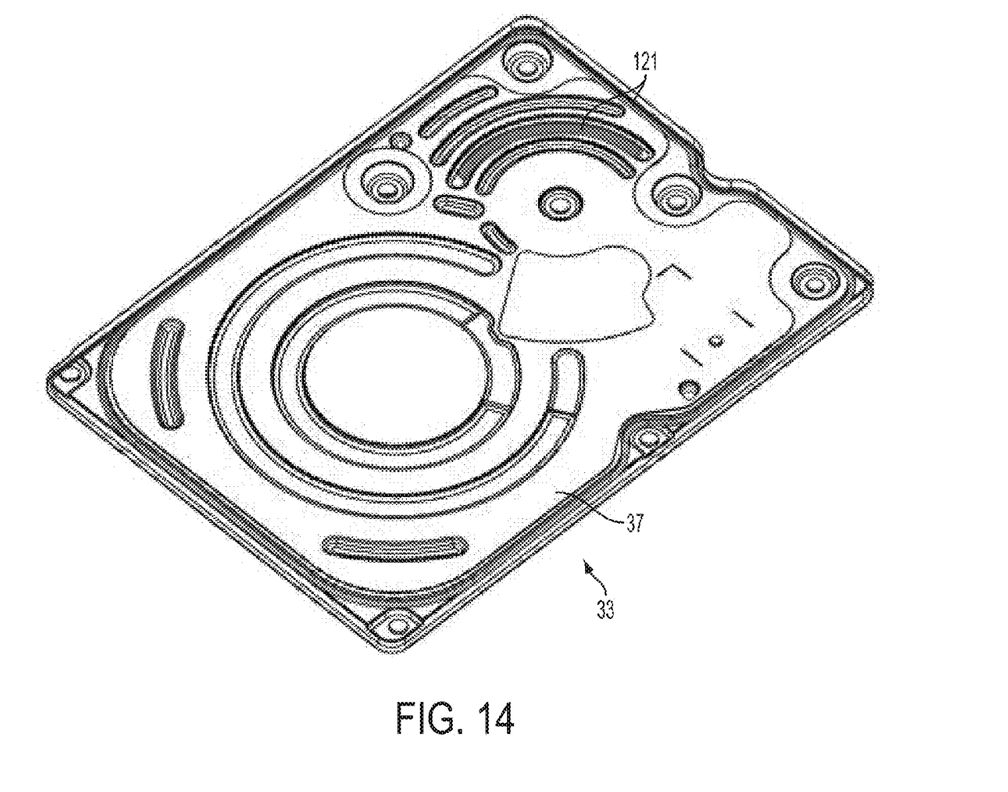
FIG. 14 is a bottom perspective illustration of a hard disk drive cover and a gasket, according to the present invention.

FIG. 14 shows a gasket 91 positioned on the smooth bottom (inner) surface 37 of the cover 33. When the cover 33 is assembled on the base assembly 31, the gasket 121 forms a seal between the bottom surface 37 and the base assembly 31. The seal protects the interior of the base assembly 31 from damaging particles, moisture vapor and/or gases in the environment. The gasket 121 is formed in place on the bottom surface 37 by extruding and curing gasket material in the required pattern. Alternatively, the gasket 121 can be formed in place by separately molding and then bonding the gasket 121 to the bottom surface 37. It is desirable for the gasket 121 to form a strong bond with the bottom surface 37. In addition to cleanliness advantages discussed above, utilizing a smoother surface finish on the bottom (inner) surface 37 improves the bond strength of the gasket 121 to the bottom surface 37.

Test data has confirmed that the smooth surface finish on the bottom surface 37 significantly improves shear strength of the bond between the gasket and the cover. The same embodiments of the invention and the prior art discussed above with respect to the cleanliness test were tested and compared with respect to shear strength of a bond between the gasket and the cover. More particularly, a form-in-place gasket 121 was placed on the bottom surface 37 with Ra of 0.074 μm. A form-in-place gasket was also placed on the bottom surface 17 with Ra of 0.7 μm. To test the bond strength, a force was applied using a rod in line with a force gauge connected to a motorized stage. The applied force was slowly increased and monitored. The shear force is the measured force in the direction parallel to the bonded cover surface at the moment of dislodging. The bond between the gasket 121 and the bottom surface 37 of the invention withstood an average shear force being 59% greater than the shear force that the bond between the gasket and the prior art bottom surface 17 was capable of withstanding. The unexpected 59% increase in bond strength for the smooth surface finish on the bottom surface 37 significantly improves the bond between the gasket 121 and the cover 33.

The shear strength of the bond can become a design consideration when determining the smoothness of the bottom surface 37. The roughness average of the bottom surface 37 can be determined based in part on the required shear strength of the bond of gasket 121 with the cover 37.

As discussed, a hard disk drive cover with a smooth bottom (inner) surface and a textured top (outer) surface is provided for covering a disk drive base assembly. A method of manufacturing the hard disk cover includes various methods for working the metal material into a metal strip having a textured surface and an opposing smooth surface. A hard disk drive cover is stamped from the worked metal strip with the smooth surface being the inner surface of the stamped cover. The smooth bottom surface 37 of the disk drive cover 33 significantly enhances cleanliness within the base assembly 31 and improves the bond between the bottom surface 37 and a gasket (or similar adhesive or sealing material).

What is claimed is:

1. A hard disk drive cover made of a single piece of metal material for covering a hard disk drive base assembly, comprising:
   an outer surface having a predetermined roughness average; and
   an inner surface having a "BA" metal finish as defined by ASTM standard 480, chemically or mechanically treated to provide a surface having a predetermined roughness average greater than or equal to 0.05 micrometers and less than or equal to 0.1 micrometers, the roughness average being less than the predetermined roughness average of the outer surface.

2. The hard disk drive cover of claim 1, wherein the predetermined roughness average of the outer surface is at least 0.127 micrometers greater than the predetermined roughness average of the inner surface.

3. The hard disk drive cover of claim 1, wherein the predetermined roughness average of the inner surface is greater than or equal to 0.051 micrometers and less than or equal to 0.254 micrometers.

4. The hard disk drive cover of claim 1, wherein the predetermined roughness average of the outer surface is 2-10 times the predetermined roughness average of the inner surface.

5. The hard disk drive cover of claim 1, wherein the predetermined roughness average of the outer surface is 5-8 times the predetermined roughness average of the inner surface.

6. The hard disk drive cover of claim 1, wherein the hard disk drive cover is made of a steel alloy.

7. The hard disk drive cover of claim 1, wherein the hard disk drive cover is made of an alloy of steel, nickel, and at least 10% chromium.

8. The hard disk drive cover of claim 1, wherein the hard disk drive cover is made of at least one of 400 series stainless steel, 300 series stainless steel, or 200 series stainless steel.

9. A hard disk drive cover made of a single piece of metal material for covering a hard disk drive base assembly, comprising:
   an outer surface chemically or mechanically treated to provide a surface having a predetermined roughness average; and
   an inner surface having a "BA" metal surface finish as defined by ASTM standard 480, the predetermined roughness average of the inner surface being greater than or equal to 0.05 micrometers and less than or equal to 0.01 micrometers, the roughness average being less than the predetermined roughness average of the outer surface.

10. The hard disk drive cover of claim 9, wherein the predetermined roughness average of the outer surface is at least 0.127 micrometers greater than the predetermined roughness average of the inner surface.

11. The hard disk drive cover of claim 9, wherein the predetermined roughness average of the inner surface is greater than or equal to 0.051 micrometers and less than or equal to 0.254 micrometers.

12. The hard disk drive cover of claim 9, wherein the predetermined roughness average of the outer surface is 2-10 times the predetermined roughness average of the inner surface.

13. The hard disk drive cover of claim 9, wherein the predetermined roughness average of the outer surface is 5-8 times the predetermined roughness average of the inner surface.

14. The hard disk drive cover of claim 9, wherein the hard disk drive cover is made of a steel alloy.

15. The hard disk drive cover of claim 9, wherein the hard disk drive cover is made of an alloy of steel, nickel, and at least 10% chromium.

16. The hard disk drive cover of claim 9, wherein the hard disk drive cover is made of at least one of 400 series stainless steel, 300 series stainless steel, or 200 series stainless steel.

* * * * *